Nov. 20, 1951 — R. C. ALEXANDER — 2,575,650
PARKING METER DEVICE
Filed Oct. 3, 1949 — 3 Sheets-Sheet 1

INVENTOR.
RUSSEL C. ALEXANDER,
BY Robert W. Fielder
ATTORNEY.

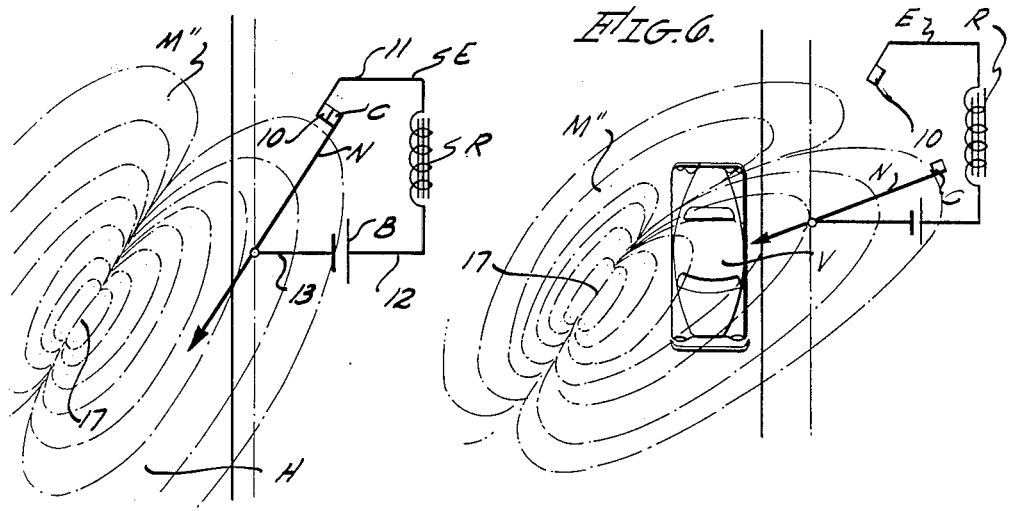
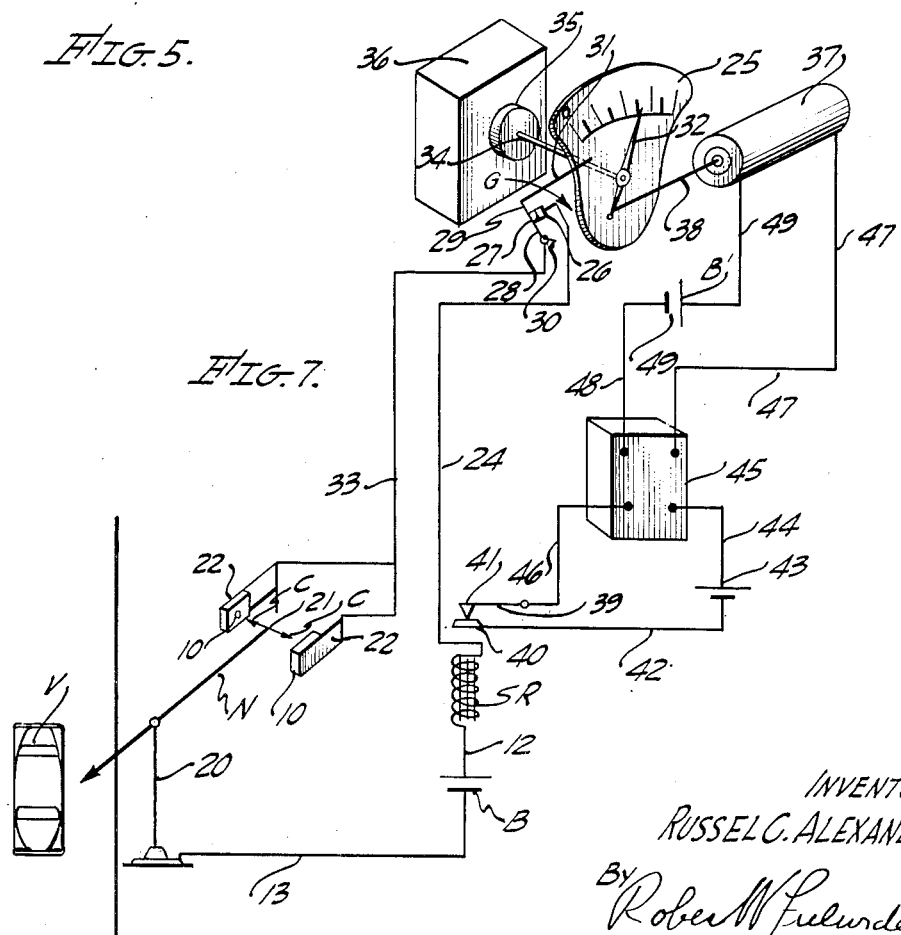

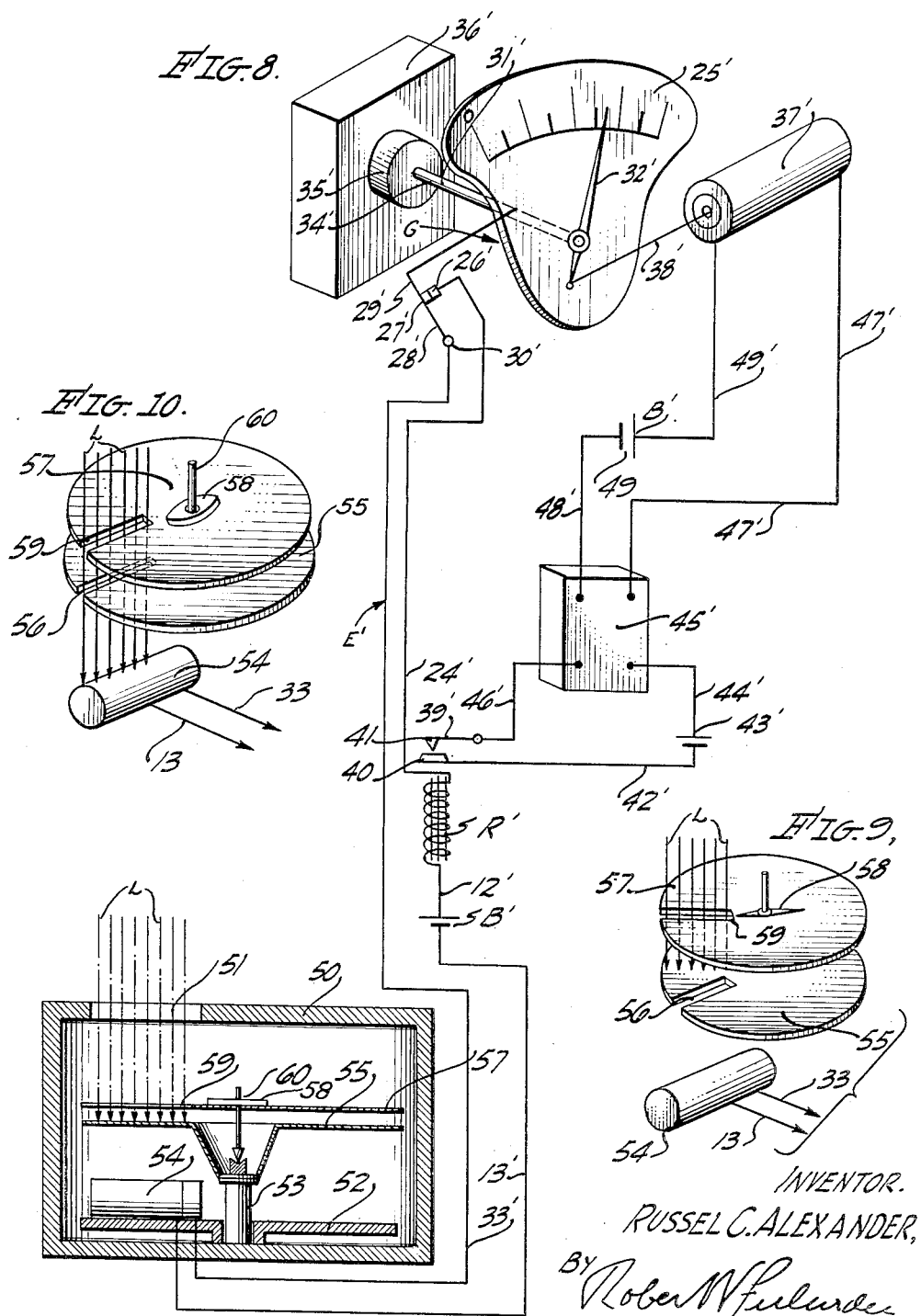

Patented Nov. 20, 1951

2,575,650

UNITED STATES PATENT OFFICE 2,575,650

PARKING METER DEVICE

Russel C. Alexander, Long Beach, Calif.

Application October 3, 1949, Serial No. 119,295

2 Claims. (Cl. 161—15)

The present invention relates to the field of timing devices, and more particularly to a parking meter device that indicates a zero reading within a predetermined length of time after a coin has been deposited therein, or prior to that time should the vehicle parked adjacent to the meter be moved from this position.

Although numerous parking meters have been devised and marketed in the past, the majority of these devices have the disadvantage that they do not return to a zero reading until the expiration of a predetermined time interval. Thus, the driver of a vehicle may deposit a coin in such a meter for perhaps a one hour parking period, and use only a small fraction of that time, with the result that other motorists may drive into the vacated stall and use the balance of the time on the meter without the municipality receiving any revenue for the parking time of the second or third motorists as the case may be. As the use of parking meters is a means of both controlling parking and raising revenue for a municipality, it will be apparent that the potential revenue is considerably lessened by motorists other than the one paying for the parking using the unexpired time indicated on the meter.

The primary purpose of the present invention is to provide a parking meter device that will eliminate the above named disadvantage which is common to the presently available meters.

A major object of the invention is to provide a parking meter that returns to a zero reading after either the expiration of a predetermined length of time or the vehicle parked by the meter being moved therefrom whichever occurs first, and due to such operation will materially increase the revenue of the municipality or agency installing the devices as free parking on the unexpired portion of another motorist's time is completely eliminated.

Another object of the invention is to supply a parking meter having a relatively simple mechanical structure, that can be fabricated from standard, commercially available material, requires no special machinery in its manufacture, can be assembled by semi-skilled personnel, and due to its low cost of manufacture can be retailed on a competitive basis with presently available devices used in controlling parking.

Yet another object of the invention is to supply a parking meter that due to its simple mechanical structure requires a minimum of maintenance attention.

A still further object of the invention is to furnish a device that while particularly adapted to be used in parking meters, may be utilized in providing desired effects such as opening or closing doors, bridges, and other structures, turning lights on and off, and starting and stopping mechanisms of various types.

These and other objects and advantages of the invention will become apparent from the following description of a preferred form and certain alternate forms thereof, and from the drawings illustrating those forms in which:

Figure 5 is a schematic plan view of an electrical circuit that includes a compass needle that deviates due to a magnetic field set up by a permanent magnet embedded in the highway, and a meter restoring relay, with the relay being actuated upon a vehicle departing from a position adjacent to the needle;

Figure 6 is the same view shown in Figure 5, with the position of the needle being altered by the presence of a vehicle to maintain the electrical circuit in a non-actuating condition;

Figure 7 is a perspective view of a preferred form of parking meter mechanism utilizing a magnetic needle under one of the sets of conditions shown in Figures 1 to 6 inclusive;

Figure 8 is a perspective view of an alternate form of parking meter mechanism using both a magnetic needle and a photoelectric cell;

Figure 9 is a perspective view of the control mechanism for the photoelectric cell controlled circuit shown in Figure 9, with the position of the plates being that occupied when a vehicle is adjacent to the device; and, Figure 10 is the same perspective view of the control mechanism as shown in Figure 9, with the plates being in the position they occupy when a vehicle departs from a location adjacent the meter.

Referring now to Figures 1 to 6 inclusive for the general arrangement of the present invention, it will be seen that a freely rotatable compass needle N having an electrical contact C mounted on one end thereof is normally held in a position parallel to certain lines of magnetic force M, but upon a vehicle V having material of a magnetic nature forming a part thereof being positioned adjacent to the needle N the lines of force M are temporarily distorted and the needle is moved to a new position parallel to the distorted lines of force. As the needle N is moved to the new position parallel to the distorted lines of magnetic force the contact point C breaks an electrical circuit E that will hereinafter be described in detail. The completion of the electrical circuit E energizes the meter restoring relay R, with the result that the unexpired time indicating means provided on all parking meters is returned to the zero position. Thus, upon the vehicle V departing from a position adjacent to the needle N the needle returns to its initial position and completes the electrical circuit E to return the unexpired time indicating means (not shown) to the zero position.

Figure 1:
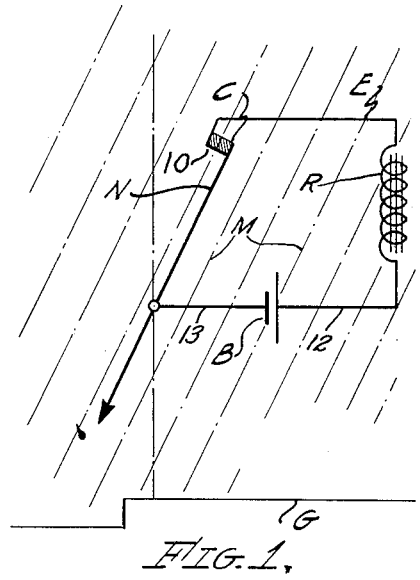
Figure 1 is a schematic elevational view of an electric circuit having a meter restoring relay and dipping compass needle forming a portion thereof, with the relay being actuated when a vehicle departs from a position adjacent to the needle.

As is well known the terrestrial lines of magnetic force M shown in Figure 1 are so situated that the compass needle N will have an appreciable dip which varies from location to location, with the position of the needle N being parallel to the magnetic lines of force M when the vehicle V is not situated adjacent to the needle. The contact point C when the vehicle V is not adjacent to the needle N engages a contact point 10 from which an insulated conductor 11 extends to the meter restoring relay R to form a portion of the electrical circuit E. The balance of the circuit E includes an electrical conductor 12 extending from the relay R to a battery B or other source of electrical energy, and an electrical conductor 13 that extends from the battery to the compass needle N.

Figure 2:
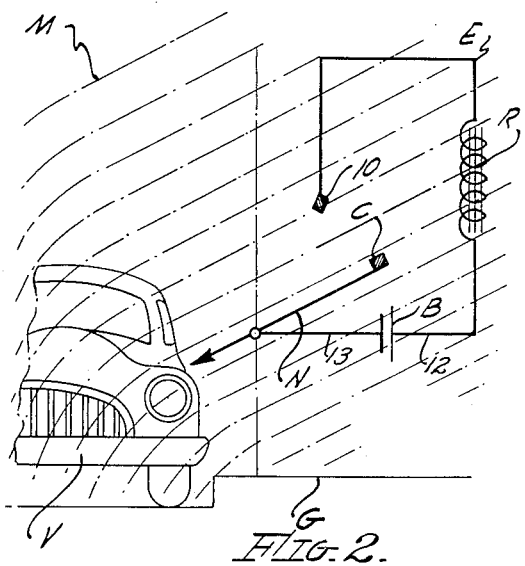
Figure 2 is the same as the view shown in Figure 1, with the position of the needle being altered by the presence of a vehicle to maintain the electrical circuit in a non-actuating condition.

In Figure 2 it will be seen that upon a magnetic mass such as the vehicle V being positioned adjacent to the needle N, the lines of force M are distorted with the needle N pivoting to a new position parallel thereto. Thus, the distortion of the magnetic lines of force and the attraction of the vehicle V cause the needle N to assume a position more nearly parallel to the ground surface G. The electrical contact point C and 10 are separated when the needle N rotates to the new position, with the result that the electrical circuit E is prevented from energizing the meter restoring relay R. However, upon the vehicle V departing from a position adjacent the needle N, the needle returns to its initial position where an electrical circuit E is completed through the contact points C and 10. Upon completion of the electrical circuit E an unexpired time indicating device (not shown) is returned to the zero position by means that will hereinafter be described in detail. In this form of the invention as well as those that will hereinafter be discussed, no housing or case for the invention is disclosed or described, as the housing or case may have any one of a number of conventional forms so long as the material used in fabricating the housing or case is of a non-magnetic nature. It will be apparent that a magnetic material cannot be used for such a housing or case as the needle N would be attracted thereto, and not operate satisfactorily in detecting the departure of the vehicle V from a position adjacent to the needle N.

Figure 3:
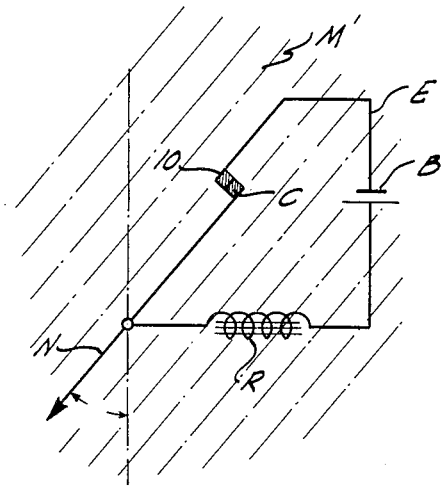
Figure 3 is a schematic plan view of an electric circuit having a horizontally rotatable compass needle and a meter restoring relay forming portion thereof, with the relay being actuated when a vehicle departs from a position adjacent to the needle.
Figure 4:
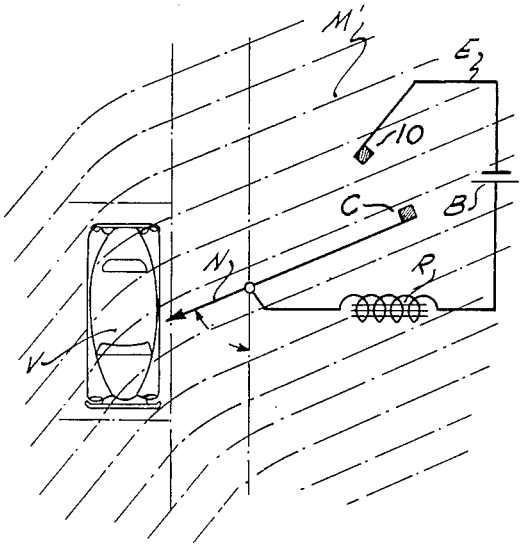
Figure 4 is the same view shown in Figure 3, with the position of the needle altered by the presence of a vehicle to maintain the electrical circuit in a non-actuating condition.

In Figures 3 and 4 the same electrical circuit E is used as above described, but with the needle N being positioned to rotate in a substantially horizontal plane whereby it may align itself parallel to the horizontal component M' of the terrestrial lines of force encircling the earth. The operation of this form of my device is the same as above described with the exception that the contact point C moves in a substantially horizontal plane relative to the contact point 10, rather than in a vertical plane as described in connection with Figures 1 and 2 of the invention.

In certain localities it has been found from experience that the terrestrial magnetic lines of force M or M' utilized in the devices shown in Figures 1 to 4 inclusive are not sufficient to hold the compass needle N in the desired location, and in such locations the device disclosed in Figures 5 to 6 is used. A permanent magnet 17 is embedded in a street or highway H, and provides magnetic lines of force M'' that serve to hold the needle N in the position shown in Figure 5. Upon vehicle V being driven to the position adjacent the device shown in Figure 5 the needle N assumes a position parallel to the distorted lines of force as shown in Figure 6, with the result that the contact point C is moved out of engagement with the contact point 10, and the electric circuit E is broken in the same manner as discussed in connection with the devices disclosed in Figures 1 to 4 inclusive. However, upon the vehicle V departing from a position adjacent to the needle N, the lines of force M'' resume their initial shape, and the needle N returns to the position shown in Figure 5 to complete the electric circuit E. Completion of the circuit E actuates the meter restoring relay R to return the unexpired time indicating device to the zero position.

The three forms of the device described in Figures 1 to 6 inclusive disclose in a general way the manner in which the invention operates by utilizing the vertical dip of a compass needle N, the deviation of the needle N from its normal or horizontal position, and the use of the needle N and an artificial magnetic field M''.

The structure of a preferred form of parking meter utilizing a needle N in one of the various fields of magnetic force disclosed in Figures 1 to 6 inclusive is shown in Figure 7. The compass needle N is pivotally supported on a mounting 20 that is suitably positioned for the particular plane in which the needle N is to pivot. Thus, in the form of the device shown in Figures 1 and 2 the mounting 20 must provide for vertical movement of the needle N as the variation in the dip of the needle N is used to detect the departure of the vehicle V from its position adjacent to the device. However, in the form of the device shown in Figures 3 to 6 inclusive, the deviation of the needle from the horizontal lines of magnetic force M' and M'' is used to detect the departure of the vehicle V from a position adjacent to the needle, and the mounting 20 must therefore provide for substantially horizontal pivoting of the needle N.

In the actual construction of the device a transversely positioned metallic member 21 is preferably provided on one end of the needle N, with each end of the member 21 having a contact C mounted thereon. Each of the contact points C is so arranged that it may engage one of the two contact points 10, with each of the points 10 being supported on one of two metallic plates 22. The plates 22 are laterally disposed, and the needle N when the vehicle V is adjacent thereto is so positioned by the distorted lines of magnetic force M, M' or M'' that neither of the contact points C engages the contact point 10 situated adjacent thereto. The needle N will be held against swinging beyond the position described by the damping effect of the magnetic field. However, upon the vehicle V departing from the parked position adjacent the needle N, the normal lines of magnetic force M, M' or M'' return the needle N to a position where one of the contact points 10 engages one of the contact points C. Extending from the compass needle support 20 to the battery B as previously discussed and shown in connection with Figures 1 to 6 inclusive, is the conductor 13, while another conductor 12 extends from the battery relay R. The conductor 11 shown in the simplified version of the invention in Figures 1 to 6 inclusive, is somewhat more complicated in actual practice. The conductor 11 is replaced by a conductor 24 that extends upwardly towards a time indicating dial 25 that is normally provided on all parking meters. The conductor 24 terminates on its upper end in a contact point 26, which contact point when there is unexpired time on the dial 25 engages a contact point 27 that is situated on a leg 28 of an L-shaped member 29. The member 29 is pivotally supported on the lower end of the leg 28 by a suitable pin 30. Another leg 31 forms a portion of the member 29 and extends forwardly slightly beyond the zero mark on the dial 25, with the result that a needle 32 used in indicating the unexpired time on the dial 25 strikes the leg 31 as it is returned to the zero position and rotates member 29 about its pivot counter-clockwise and separates contacts 26, 27. Member 29 is normally urged toward position to close contacts 26, 27 in any suitable manner, for instance as indicated in Figure 7, by gravity which tends to turn the member 29 clockwise about its pivot. Direction of movement of members 29 and 29' is shown in Figures 7 and 8 by an arrow identified by letter "G" for gravity. An electrical conductor 33 extends from the pin 30 to the two plates 22.

The unexpired time indicating needle 32 is mounted on a shaft 34 that extends through the dial 25 to a clutch 35. The clutch 35 is driven by either a mechanical or electrically operated mechanism 36 that rotates the needle in a predetermined length of time from right to left over the dial 25 after a coin has been deposited in the meter in a conventional manner. The coin receiving mechanism as well as the clutch driving mechanism 36 are of a conventional nature, such as used in present parking meters. An electrically operated solenoid 37 is disposed adjacent to the dial 25, and has a plunger 38 slidably mounted therein that is pivotally connected on its outer end to the lower portion of the unexpired time indicating needle 32.

Upon the vehicle V departing from a position adjacent to the needle N, the magnetic lines of force M, M' or M''' return to their initial shape and cause the needle N to pivot sufficiently to complete an electrical circuit through one of the contact points 10, conductor 33, contact point 27, contact point 26, conductor 24, power amplifying relay R, and conductor 12 to the battery B, while the other portion of the electric circuit E includes the support 20 and conductor 13 to the battery B. As the electrical circuit E is completed, a pivotally mounted arm 39 that forms a part of the relay R is moved to separate a contact point 40 and a contact point 41, and break a normally closed electric circuit that includes a conductor 42, a battery 43, a conductor 44 extending to a variable time relay 45, and a conductor 46 extending from the time relay 45 to the movable arm 39. Upon the electrical circuit to the variable time relay 45 being broken, an electrical circuit in the solenoid 37 is established, with the circuit including a conductor 47 leading from the relay 45 to the solenoid, a conductor 48 leading from the relay to a battery B', and a conductor 49 leading from the battery B' to the solenoid 37. As the solenoid 37 is electrically energized the plunger 38 is moved to the right, with the result that the unexpired time indicating needle 32 is pivoted in a counterclockwise direction to strike the forward end of the arm 31. The needle 32 by such movement is returned to a zero indicating position on the dial 25, and the L-shaped member 29 is pivoted to separate the two electrical contact points 26 and 27. The clutch 35 while adapted to exert sufficient force to move the unexpired time indicating needle 32 across the face of the dial 25 due to the action of the mechanism 36 slips easily, and permits the needle 32 to be returned to the zero position by action of the plunger 38.

The operation of the preferred form of the invention is quite simple. Upon the vehicle V being parked adjacent to the invention a coin is placed in the device which actuates the mechanism 36 to pivot the needle first to the right, and then slowly pivot it to the left over the face of the dial in a predetermined length of time. The needle 32 at all times indicates the unexpired time on the dial face 25.

Upon the vehicle V being positioned adjacent to the needle N the lines of magnetic force M, M' or M'' are distorted and the needle is held in a position in which the contact points C and 10 are separated to break the electric circuit E. However, upon the vehicle V being moved from its position adjacent the needle N prior to the expiration of the predetermined length of time for which a coin was deposited, the needle N returns to its initial position parallel to the undistorted lines of force. In the latter position the electric circuit E is momentarily closed by the contact points C and 10, and 26 and 27 engaging one another. The relay R is thus energized to cause the electrical energization of the solenoid 37, with the result that the plunger 38 returns the needle 32 to the zero position. As the needle 32 is placed in the zero position the L-shaped member 29 is pivoted to separate the contact points 26 and 27 and break the electric circuit E, with the result that the drain on the battery B is momentary and quite intermittent. Thus, the unexpired time indicating needle 32 is returned to the zero position either by the expiration of the predetermined length of time for which a coin was deposited, or by the departure of the vehicle V from a position adjacent the nedle N, whichever occurs first.

Although the preferred form of the invention described above has been found from experience to operate satisfactorily, it may be desired to eliminate the use of electrical contact points C on the compass needle N. A device that eliminates the use of the contact points C and 10 is disclosed in Figures 8, 9, and 10. This alternate form of the device with the exception of the portion thereof that discloses the departure of the vehicle V from a position adjacent to the compass needle N is identical with the previously discussed form of the invention.

A cylindrical housing 50 formed of a non-magnetic material is provided, with the housing having an opening 51 formed in the top thereof. An annular plate 52 is movably supported on a substantially vertical member 53, and is adapted to be adjustably rotated in a horizontal plane. The plate 52 supports a conventional photoelectric cell 54 that is connected to the two conductors 33 and 13 described in the preferred form of the invention. The plate 52 is rotated to a position in which the photoelectric cell 54 is parallel to the normal lines of magnetic force M, M' or M", and an annular plate 55 of an opaque non-magnetic material is adjustably supported in a horizontal plane on the upper end of the support 53, with the plate 55 having a slot 56 formed therein that is in vertical alignment with the photoelectric cell 54.

An opaque plate 57 having a slot 59 formed therein, and a compass needle 58 mounted on the plate in alignment with the slot, is supported for rotation in a horizontal plane from a shaft or pin 60 mounted in a vertical position on the upper end of the support 53. The position of the plate 57 when the vehicle V is in a position adjacent to the needle 58 is shown in Figure 9. Light rays L entering the opening 51 pass downwardly through the slot 59 but are blocked by the opaque plate 55. However, as the vehicle V departs from a position adjacent the needle 58, the plate 57 and needle 58 are rotated until the needle is parallel with the undistorted lines of magnetic force M, M', or M", with the plate 57 then being in the position shown in Figure 10 whereupon light may pass downwardly through the opening 51, slots 59 and 56 to the photoelectric cell 54. The light L striking the photoelectric cell 54 completes an electrical circuit through the conductor 33', contact point 27', contact point 26', conductor 24', relay R', conductor 12' to the battery B. The other portion of the electric circuit E includes an insulated conductor 13' that extends from the photoelectric cell 54 to the battery B. This alternate form of the device wtih the exception of the portion thereof that indicates the departure of the vehicle V from a position adjacent to the needle 58 operates in exactly the same manner as the preferred form of the invention. The same numerals have been used in indicating identical portions of the preferred and alternate forms of the invention, with the numerals in the alternate form having a prime affixed thereto. The operation of the preferred form and alternate form of my invention have previously been discussed in detail, and need not again be repeated.

Although the preferred form and alternate forms of my invention are fully capable of achieving the objects and providing the advantages hereinbefore mentioned, it is to be understood that they are merely illustrative of the presently preferred embodiments thereof, and that I do not mean to limit myself to the details herein shown and described other than as defined in the appended claims.

The invention claimed is:

1. A parking meter that includes: unexpired time indicating means; means to place said unexpired time indicating means in operation for a predetermined length of time; a compass needle, with said needle occupying a first position when a vehicle is adjacent thereto and a second position when no vehicle is adjacent thereto; an opaque member rigidly affixed to said needle, with said member having an aperture formed therein through which light may pass; a photoelectric cell positioned in vertical alignment with said aperture when said needle is in said second position; and electrical means capable of returning said unexpired time indicating means to a zero reading position when said electrical means is energized, and said photoelectric cell operatively connected to said electrical means to permit energization of said electrical means when light strikes said cell.

2. A parking meter that includes: unexpired time indicating means; means to place said unexpired time indicating means in operation for a predetermined length of time; a compass needle, with said needle occupying a first position when a vehicle is adjacent thereto and a second position when no vehicle is adjacent thereto; an opaque plate rigidly affixed to said needle, with said plate having an aperture formed therein; a second opaque plate vertically separated from said first plate, with said second plate having an aperture formed therein that is in vertical alignment with the aperture in said first plate when said needle is in said second position; a photoelectric cell positioned under said plates, and situated in vertical alignment with said apertures when said needle is in said second position; electrical means to return said unexpired time indicating means to a zero reading position; an electric circuit operatively associated with said photoelectric cell, with said circuit being completed when light falls on said cell, and said circuit when completed energizing said electrical means to return said unexpired time indicating means to a zero position.

RUSSEL C. ALEXANDER.

REFERENCES CITED

The following references are of record in the file of this patent:

UNITED STATES PATENTS

| Number | Name | Date |
|---|---|---|
| 2,095,114 | Wood et al. | Oct. 5, 1937 |
| 2,121,179 | Sweetland | June 21, 1938 |
| 2,178,315 | Sweetland | Oct. 31, 1939 |
| 2,251,407 | Johns | Aug. 5, 1941 |